(12) United States Patent
Kasai et al.

(10) Patent No.: US 7,582,383 B2
(45) Date of Patent: Sep. 1, 2009

(54) COMPLEX OXIDE MATERIALS AND CATHODE MATERIALS FOR LITHIUM ION BATTERY

(75) Inventors: Masahiro Kasai, Mito (JP); Toyotaka Yuasa, Hitachi (JP)

(73) Assignee: Shin-Kobe Electric Machinery Co., Ltd., Tokyo (JP)

(*) Notice: Subject to any disclaimer, the term of this patent is extended or adjusted under 35 U.S.C. 154(b) by 498 days.

(21) Appl. No.: 11/211,698

(22) Filed: Aug. 26, 2005

(65) Prior Publication Data

US 2006/0046142 A1    Mar. 2, 2006

(30) Foreign Application Priority Data

Aug. 26, 2004  (JP) ............................. 2004-247221

(51) Int. Cl.
- *H01M 4/00* (2006.01)
- *H01M 4/50* (2006.01)
- *H01M 4/58* (2006.01)
- *C01D 1/02* (2006.01)
- *C01G 45/12* (2006.01)

(52) U.S. Cl. ............... 429/223; 429/224; 429/231.3; 423/594.4; 423/599

(58) Field of Classification Search ................. 429/223, 429/224, 231.3; 423/594.4, 599
See application file for complete search history.

(56) References Cited

U.S. PATENT DOCUMENTS

| | | |
|---|---|---|
| 6,040,090 A * | 3/2000 | Sunagawa et al. ...... 429/231.95 |
| 2003/0082448 A1 * | 5/2003 | Cho et al. ............... 429/218.1 |
| 2006/0057466 A1 * | 3/2006 | Suhara et al. ............. 429/322 |

FOREIGN PATENT DOCUMENTS

| | | | |
|---|---|---|---|
| JP | 2001052704 | * | 2/2001 |
| JP | 2003-297359 | | 10/2003 |
| WO | WO2005/028371 A1 | * | 3/2005 |

* cited by examiner

*Primary Examiner*—Patrick Ryan
*Assistant Examiner*—Muhammad Siddiquee
(74) *Attorney, Agent, or Firm*—Antonelli, Terry, Stout & Kraus, LLP.

(57) ABSTRACT

A lithium secondary battery that is highly safe and has long life. The battery, which is a nonaqueous lithium secondary battery, utilizes a cathode active material comprising a complex oxide material having a layered structure containing at least Li and Ni and being represented by the chemical formula $Li_xNi_a(Mn_yM_{1-y})_b(Co_zM'_{1-z})cO_2$ ($0<x<1.2$, $0<y<1$, $0<z<1$, $a+b+c=1$, $9b \leq 5a+2.7$, $0<a<1$, $0<b<1$, $0<c<1$, M: quadrivalent element other than Mn, and M': trivalent element other than Co).

9 Claims, 5 Drawing Sheets

COMPLEX OXIDE MATERIALS AND CATHODE MATERIALS FOR LITHIUM ION BATTERY

BACKGROUND OF THE INVENTION

1. Field of the Invention

The present invention relates to complex oxide materials and high energy-density lithium batteries in which a complex oxide material is used as a cathode active material for lithium secondary batteries. Particularly, the invention relates to lithium secondary batteries for automotive applications.

2. Background Art

JP Patent Publication (Kokai) No. 2000-77072 A discloses an example of conventional lithium secondary batteries in which attempts are made to achieve higher levels of safety by employing a complex oxide consisting of Li and Ni, namely, a mixture of lithium nickelate and lithium manganese oxide, as a cathode active material that contains at least Li and Ni. However, no batteries have so far been obtained that can sufficiently satisfy both the safety and long-life requirements for electric vehicles.

SUMMARY OF THE INVENTION

Secondary batteries as the power supply for moving objects, such as electric vehicles including electric automobiles and motorcycles, are required to have far higher levels of safety and longer life than those for household purposes. It is therefore an object of the invention to provide a cathode active material for lithium secondary batteries that can provide high levels of safety and long-life, and a lithium secondary battery utilizing such material.

In order to achieve the aforementioned object, the invention employs a cathode active material for layered lithium secondary batteries comprising at least Li and Ni. The cathode active material comprises, in addition to Li and Ni, a quadrivalent element other than Mn and a trivalent element other than Co and has a chemical formula $Li_xNi_a(Mn_yM_{1-y})_b(Co_zM'_{1-z})cO_2$ ($0<x<1.2$, $0<y<1$, $0<z<1$, $a+b+c=1$, $9b \leq 5a+2.7$, $0<a<1$, $0<b<1$, $0<c<1$, M: quadrivalent element other than Mn, M': trivalent element other than Co). Preferable examples of the quadrivalent element include representative elements, such as Si, Ge, and Sn, and quadrivalent transition metals, such as Ti, V, Fe, and W. The quadrivalent element M is not limited to a single kind but may consist of a plurality of aforementioned elements. Preferable examples of the trivalent element include representative elements, such as Al, Ga, and In, trivalent transition metals, such as Sc, Cr, and Mo, and rare earths such as Y, La, Ce, Eu, Gd, and Nd. The aforementioned trivalent element M' is not limited to a single kind but may consist of a plurality of aforementioned elements.

The cathode material of the invention comprises a base material of a complex oxide with a layered structure containing Ni, Mn, and Co in addition to Li in which elements other than those mentioned above are substituted. The complex oxide can be formally represented by $Li_xNi_aMn_bCo_cO_2$ ($0<x<1.2$, $a+b+c=1$, $0<a<1$, $0<b<1$, $0<c<1$).

The cathode material of the invention can be obtained by reducing the composition of Mn, substituting the quadrivalent elements such as Si, Ge, Sn, and Ti, reducing the composition of Co, and substituting the trivalent elements such as Al, Ga, In, Mo, and Y. In accordance with the invention, it is essential to adopt the aforementioned ratios of substitution elements, and no suitable material would be obtained if substitution were to take place at arbitrary ratios. This is because it is necessary to achieve a crystal structure in which the bivalent Ni ion, the quadrivalent Mn ion, and the trivalent Co ion are balanced in terms of charge, where the gist of the technical concept of the invention obviously lies.

The inventors have found that the cathode material of the invention, which can be represented by the chemical formula $Li_xNi_a(Mn_yM_{1-y})_b(Co_zM'_{1-z})cO_2$ ($0<x<1.2$, $0<y<1$, $0<z<1$, $a+b+c=1$, $9b \leq 5a+2.7$, $0<a<1$, $0<b<1$, $0<c<1$, M: quadrivalent element other than Mn, M': trivalent element other than Co), can be prepared in a desired manner only within the range of composition indicated in the parentheses. If the aforementioned range is exceeded, contamination by impurities, such as $Mn_3O_4$, or a drop in crystallinity results.

The cathode active material of the invention is prepared by the following process. Starting materials include oxides, hydroxides, carbonates, sulfates, or nitrates. These starting materials, which are used in the form of powder, are pulverized and mixed in a ball mill or a vibration mill. For example, a cathode active material represented by $LiNi_{0.35}Mn_{0.30}Si_{0.05}Co_{0.10}Al_{0.20}O_2$ is synthesized in the following manner. Starting materials lithium carbonate $Li_2CO_3$, manganese dioxide $MnO_2$, silicon monoxide SiO, and aluminum hydroxide $Al(OH)_3$ in powder form are weighed such that the molar ratios of the metal elements are equal to the ratios of the desired material, and they are then mixed. The thus mixed material powder is put in a vessel made of high-purity alumina and calcinated at temperature ranging from 800° C. to 950° C. in an atmosphere of air in an electric furnace. The calcinated powder that has been cooled down to room temperature is again pulverized and mixed in a mixer, and is then subjected to a second calcination process in an atmosphere of air at temperature ranging from 1000° C. to 1100° C. The resultant powder is then pulverized and classified in an automatic sieve to achieve a predetermined particle size, preferably 40 micrometers or less, thereby obtaining a cathode active material.

The cathode active material of the invention is a complex oxide that contains at least Li and Ni, as mentioned earlier. A complex oxide is an oxide consisting of a plurality of metal elements, and it is produced in the form of powder. The aforementioned complex oxide material is used for producing a cathode, namely, a cathode active material, for a lithium secondary battery for electric vehicles. However, the application of the complex oxide material of the invention is not limited to the lithium secondary battery for electric vehicles. For example, in terms of energy storage devices, the complex oxide material of the invention can be added in electrodes for mobile devices, such as cellular phones, or in electrodes for capacitors including electrochemical capacitors, redox batteries, or fuel batteries. It can also be used as a structural material after pressurizing and heating processes, or it can be added in a lubricant or an electromagnetic shield material by taking advantage of its electrical conductivity.

In order to use the complex oxide material of the invention as a cathode active material for lithium batteries, its powder property or crystallinity must be controlled. With regard to powder property, which is defined by tap density, bulk density, and mean density, for example, mean particle diameter $D_{50}$ should be 25 micrometers or less, preferably 15 micrometers or less, and more preferably 10 micrometers or less. The frequency of microscopic particles of 1 micrometers or smaller that is contained needs to be 5% or less. As to crystallinity, it can be determined by X-ray diffraction method, for example. Crystallinity of material is an indicator of whether the regularity of the microscopic arrangements of elements of which a powder consists is good or not. If the material has poor crystallinity, this would lead to problems such as shorter life of the battery or a decrease in its capacity. Specifically, when the diffraction pattern of the material is measured by X-ray diffraction method using the Cu-kα line, the half-value width of a diffraction peak observed within the angles of 20 to 80 degrees in terms of 2θ value should be 0.1 degree or less, and preferably 0.05 degree or less. By using such a complex oxide as the cathode active material, predetermined battery performance can be obtained.

In addition, in order to use the complex oxide material of the invention as the cathode active material for lithium battery, it is also important to optimize the microscopic structure of individual particles making up the powder of the material. Generally, individual particles of powder each consist of a plurality of primary particles. The size of primary particles is generally in the range of 0.1 to several micrometers. Such primary particles gather to form secondary particles of 1 to several tens of micrometers in size. A number of secondary particles gather together to form a powder material. The particles making up the powder material have microscopic structures. The powder particles can be classified into the so-called hollow particles with hollow internal structure, and solid particles with the inside thereof evenly filled with the primary particles. In accordance with the invention, desirably many solid particles are contained, and specifically 80% or more of the cathode material powder is desirably solid particles.

The microscopic structure of the particles can be examined in the following manner. Particles of the cathode material are sampled and provided in advance with a tungsten protection film by evaporation. Then, a single particle is cut off using a focused ion beam (FIB), and its cross section can be observed with a scanning electron microscope (SEM) so as to examine its particle structure.

In accordance with the invention, a lithium secondary battery for electric vehicles is produced in the following manner.

Initially, a slurry is prepared by mixing the above-described cathode active material with an electrically conducting material consisting of a carbon material powder, and a binder consisting of polyvinylidene fluoride (PVDF), for example. The mixture ratio of the electrically conducting material to the cathode active material is preferably 5 to 20% by weight. In order for the powder particles of the cathode active material to be evenly dispersed in the slurry, a sufficient kneading is carried out using a mixer equipped with stirring means such as rotating blades. The thus sufficiently mixed slurry is then applied to both sides of an aluminum foil with a thickness of 15 to 25 μm, using a roll coater, for example. After the application on either side of the foil is completed, the foil is press-dried, thereby obtaining a cathode plate. The thickness of the coated electrode laminate is preferably 20 to 100 μm. For the negative electrode, graphite, amorphous carbon, or a mixture thereof is used as the active material. The active material is mixed with a binder, applied, and then pressed, thereby obtaining an electrode, in the same way as for the cathode. The thickness of the electrode laminate is preferably 20 to 70 μm. In the case of the negative electrode, a copper foil with a thickness of 7 to 20 μm is used as a collector. The mixture ratio of coating of the negative active material and binder is preferably 90:10 in terms of weight, for example.

The coated electrodes are cut to a predetermined length, and a tab portion for drawing of current is formed by spot welding or ultrasonic welding. The tab portion is made of a rectangular-shaped metal foil of the same material as that of the collector, and it is used for drawing current from the electrode. Because the lithium secondary battery of the invention for moving objects are required to provide large currents, a plurality of such tabs must be installed. The electrodes with the tabs are then stacked with separators disposed in-between, the separators being made of porous resin, such as polyethylene (PE) or polypropylene (PP). The stack is rolled into a cylinder with a group of electrodes, and the cylinder is then stored in a cylindrical container. Alternatively, the separators may consist of pouches in which the electrodes are contained, and such pouches may be stacked one on top of another and stored in a rectangular container. The material of the container is preferably stainless or aluminum. After the group of electrodes is stored in the battery container, an electrolytic solution is injected and the container is air-tightly sealed. The electrolytic solution preferably consists of a solvent, such as diethyl carbonate (DEC), ethylene carbonate (EC), or propylene carbonate (PC), in which an electrolyte, such as $LiPF_6$, $LiBF_4$, or $LiClO_4$, has been dissolved. The concentration of the electrolyte is preferably 0.7M to 1.5M. After the electrolytic solution is injected, the battery container is air-tightly sealed, thereby completing a battery.

Thus, the use of a complex oxide material with a specific composition as a cathode active material for lithium battery makes it possible to provide a lithium secondary battery for moving objects that is safe and has a long-life.

DESCRIPTION OF PREFERRED EMBODIMENTS OF THE INVENTION

Example 1

Figure 1:
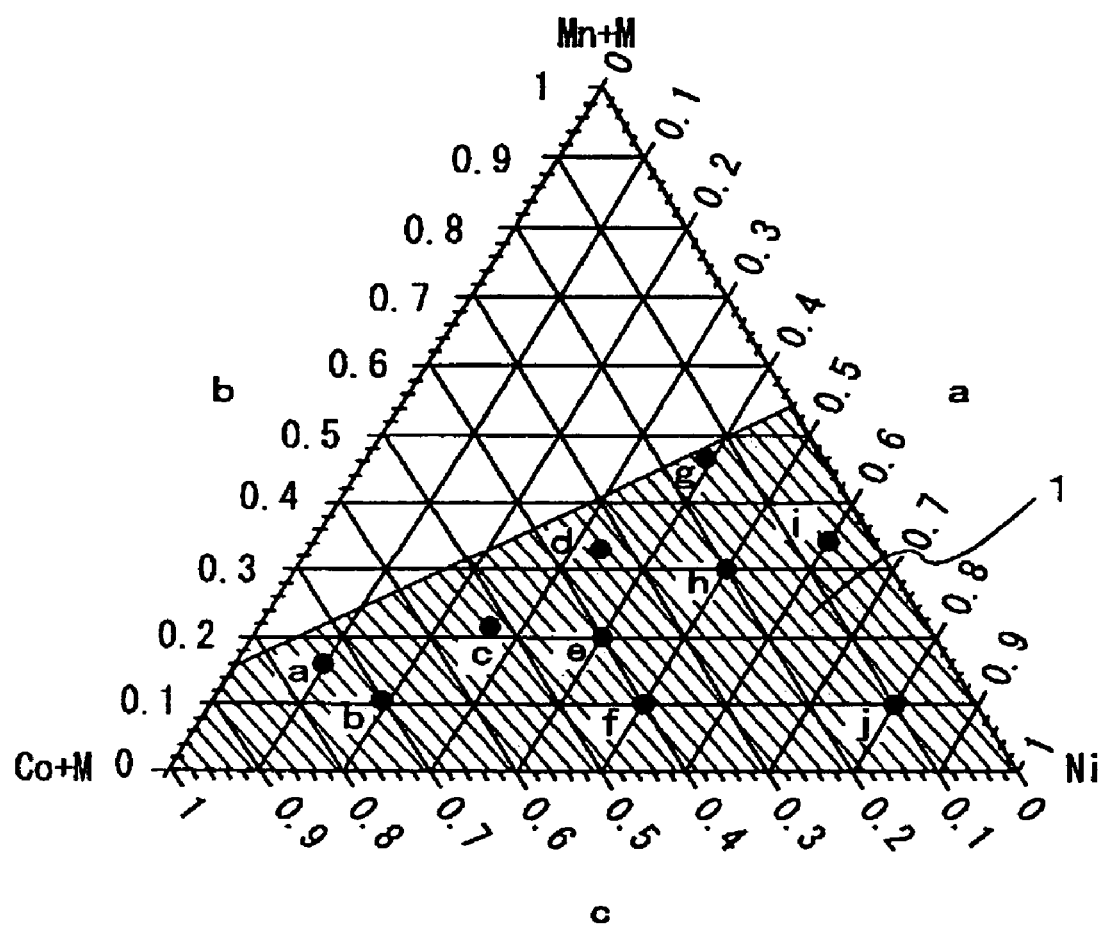
FIG. 1 shows a phase diagram of the composition of a positive electrode active material according to the invention.

In the present example, a cathode active material was synthesized using $Li_2CO_3$, $MnO_2$, $CoCO_3$, $Al(OH)_3$, $Ni(NO_3)_2$, and SiO as raw materials. The raw materials in powder form were mixed by varying the composition of the metal elements, followed by a first calcination process at 950° C. for 20 hours and then a second calcination process at 1050° C. for 20 hours, in a high-purity alumina vessel. Table 1 shows the names of the active materials of the prepared cathode active materials, and their compositions. The calcination processes were performed in the air. The resultant cathode active materials were pulverized and classified to achieve a mean particle diameter $D_{50}$=9 to 11 micrometers in each case. When the diffraction patterns of these materials were measured using X-ray diffraction equipment, some showed a hexagonal layered structure, some showed a mixture of an impurity layer including $MnO_2$, $Al_2O_3$, and $SiO_2$, and the rest exhibited the presence of a spinel phase. In the triangular phase diagram shown in FIG. 1, the compositions with which the hexagonal layered structure, which is the target of the present example, were obtained are indicated by dots "●" (a to j in FIG. 1), while the area that is claimed by the present application is indicated by hatching. It was learned that cathode active materials with the predetermined crystal structure were obtained within the range of values of a, b, and c, which indicate the composition ratio, such that a+b+c=1, 9b≦5a+2.7, 0<a<1, and 0<b<1, 0<c<1.

TABLE 1

| Name of Active Material | Composition of Active Material |
|---|---|
| (a) | $Li_{1.0}Ni_{0.1}Mn_{0.1}Si_{0.05}Co_{0.05}Al_{0.7}O_2$ |
| (b) | $Li_{1.08}Ni_{0.18}Mn_{0.06}Si_{0.05}Co_{0.06}Al_{0.65}O_2$ |
| (c) | $Li_{1.1}Ni_{0.28}Mn_{0.1}Ti_{0.11}Co_{0.05}Y_{0.46}O_2$ |
| (d) | $Li_{1.03}Ni_{0.34}Mn_{0.23}Ti_{0.10}Co_{0.10}Y_{0.23}O_2$ |
| (e) | $Li_{1.06}Ni_{0.4}Mn_{0.06}Fe_{0.14}Co_{0.10}Ga_{0.3}O_2$ |
| (f) | $Li_{1.12}Ni_{0.5}Mn_{0.05}V_{0.05}Co_{0.05}Al_{0.35}O_2$ |
| (g) | $Li_{1.08}Ni_{0.38}Mn_{0.2}Si_{0.26}Co_{0.06}In_{0.10}O_2$ |
| (h) | $Li_{1.02}Ni_{0.5}Mn_{0.1}Ge_{0.2}Co_{0.05}Al_{0.15}O_2$ |
| (i) | $Li_{1.05}Ni_{0.6}Mn_{0.05}Si_{0.05}Ti_{0.25}Co_{0.01}Al_{0.04}O_2$ |
| (j) | $Li_{1.02}Ni_{0.8}Mn_{0.01}Ge_{0.04}W_{0.05}Co_{0.03}Al_{0.04}In_{0.03}O_2$ |

Comparative Example 1

Figure 2:
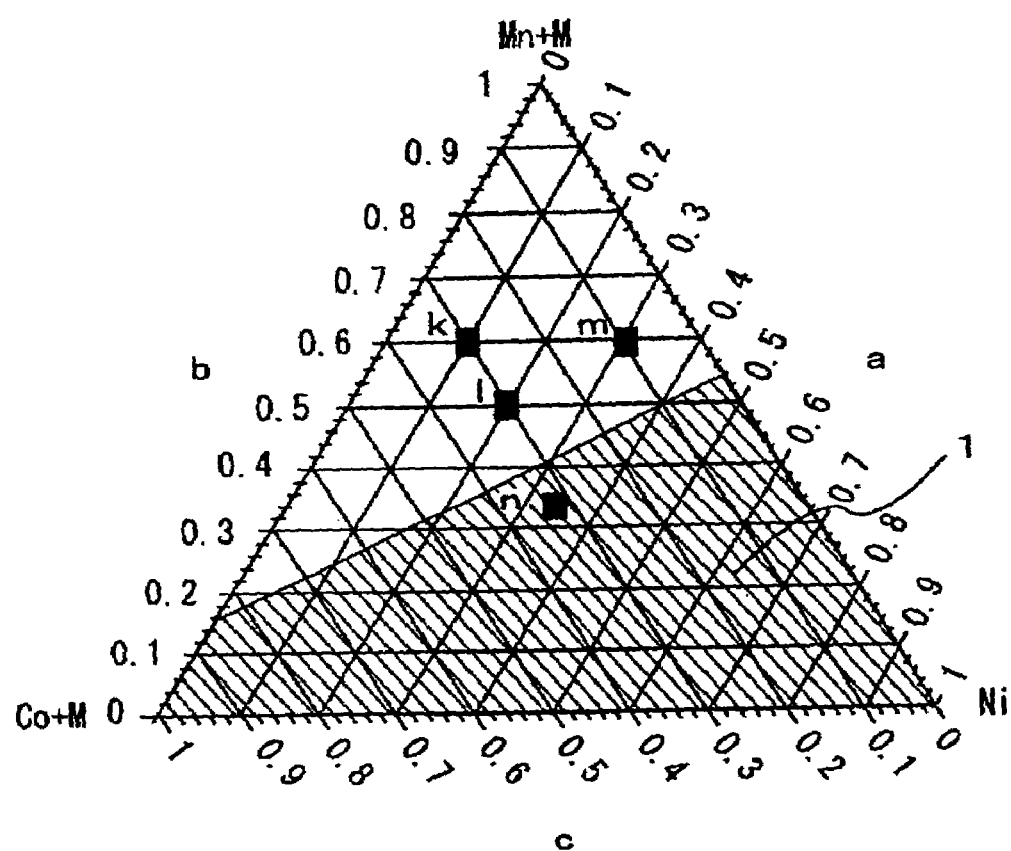
FIG. 2 shows a phase diagram of the composition of a positive electrode active material of a comparative example.

In this comparative example, cathode active materials with the compositions shown in Table 2 were prepared by the same process as that for Example 1. In FIG. 2, the compositions are indicated by letters k to m in a phase diagram. When the resultant cathode active materials were examined by X-ray diffractometry, it was observed that the active materials (k), (l), and (m) had poor crystallinity, with an increase of approximately 0.01 degrees in the half-width values of peaks that are observed near 60° and 80° in terms of 2θ value. The active material (n), which consisted solely of Ni, Mn, and Co and did not relate to the present invention, was used as a comparative example.

TABLE 2

| Name of Active Material | Composition of Active Material |
|---|---|
| (k) | $Li_{1.05}Ni_{0.1}Mn_{0.05}Ti_{0.55}Co_{0.2}Al_{0.1}O_2$ |
| (l) | $Li_{1.03}Ni_{0.2}Mn_{0.05}Si_{0.45}Co_{0.2}Al_{0.1}O_2$ |
| (m) | $Li_{1.12}Ni_{0.32}Mn_{0.2}Si_{0.38}Co_{0.05}Ge_{0.05}O_2$ |
| (n) | $Li_{1.02}Ni_{1/3}Mn_{1/3}Co_{1/3}O_2$ |

The characteristics of the materials (a) to (j) of Example 1 and those of Comparative Example were compared by preparing batteries in the following manner.

Thirteen percent by weight of a mixture of graphite and acetylene black was added to cathode active material. After the mixture was sufficiently stirred by a mixer, polyvinylidene fluoride (PVDF) diluted with N-methylpyrrolidone (NMP) was then added, thereby obtaining a slurry. The thus prepared slurry was applied to an aluminum foil with a thickness of 20 micrometers and, after drying, the foil was pressed by a roll press. After adjusting the current density to 2.75 g/cm³, the foil was vacuum-dried, thereby completely evaporating the NMP solvent. A negative electrode was similarly prepared by applying amorphous carbon powder with a mean particle diameter of 7 micrometers to a copper foil 10 micrometer in thickness and then pressing it. These positive and negative electrodes were each cut into a band with a width of 145 mm, which was then wound into a cylinder with a polyethylene porous film separator with a thickness of 30 micrometers disposed in-between, thereby preparing an electrode. The electrodes were then inserted into a battery can made of SUS with an internal diameter of 45 mm and a length of 200 mm, to which an electrolytic solution was further injected and the can was air-tightly sealed, thereby preparing a battery. The electrolytic solution consisted of a solvent, which was a 1:1 mixture of dimethyl carbonate and diethyl carbonate, to which lithium phosphate hexafluoride with a concentration of 1M was added as electrolyte. After initializing the finished battery with a charge voltage of 4.15 V, evaluation was conducted.

An overcharge test was conducted whereby each battery was charged with electric charge that was 150% of the capacity of each battery. The results showed that, in the case of the battery with the cathode active material of Example 1 of the invention shown in Table 1, a pressure-releasing valve installed on the battery was simply activated in response to the generation of gas caused by the breakdown of the electrolytic solution that accompanied voltage increases. Meanwhile, in the cases of batteries employing the cathode active materials (k) to (m) in the comparative example as shown in Table 2, the emission of white smoke was observed, in addition to the activation of the pressure-releasing valve. In the case of the battery comprising the cathode active material (n), sparks were produced in addition to the aforementioned events. The results of the overcharge test are summarized in Table 3.

TABLE 3

| Name of Active Material | Behavior upon 150% Overcharge |
|---|---|
| (a) | Activation of pressure-releasing valve due to generation of gas |
| (b) | Activation of pressure-releasing valve due to generation of gas |
| (c) | Activation of pressure-releasing valve due to generation of gas |
| (d) | Activation of pressure-releasing valve due to generation of gas |
| (e) | Activation of pressure-releasing valve due to generation of gas |
| (f) | Activation of pressure-releasing valve due to generation of gas |
| (g) | Activation of pressure-releasing valve due to generation of gas |
| (h) | Activation of pressure-releasing valve due to generation of gas |
| (i) | Activation of pressure-releasing valve due to generation of gas |
| (j) | Activation of pressure-releasing valve due to generation of gas |
| (k) | Emission of smoke in addition to activation of pressure-releasing valve |
| (l) | Emission of smoke in addition to activation of pressure-releasing valve |
| (m) | Emission of smoke in addition to activation of pressure-releasing valve |
| (n) | Sparking, emission of smoke, and activation of pressure-releasing valve |

Figure 3:
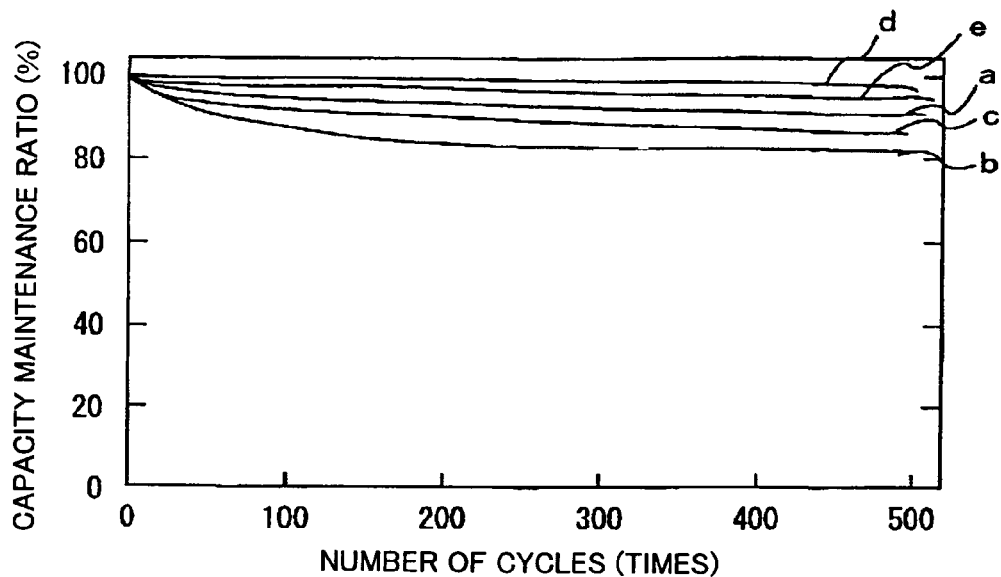
FIG. 3 shows the result of a cycle life test conducted at 60° C. on batteries (a to e) in which the active material of Example 1 is utilized.
Figure 4:
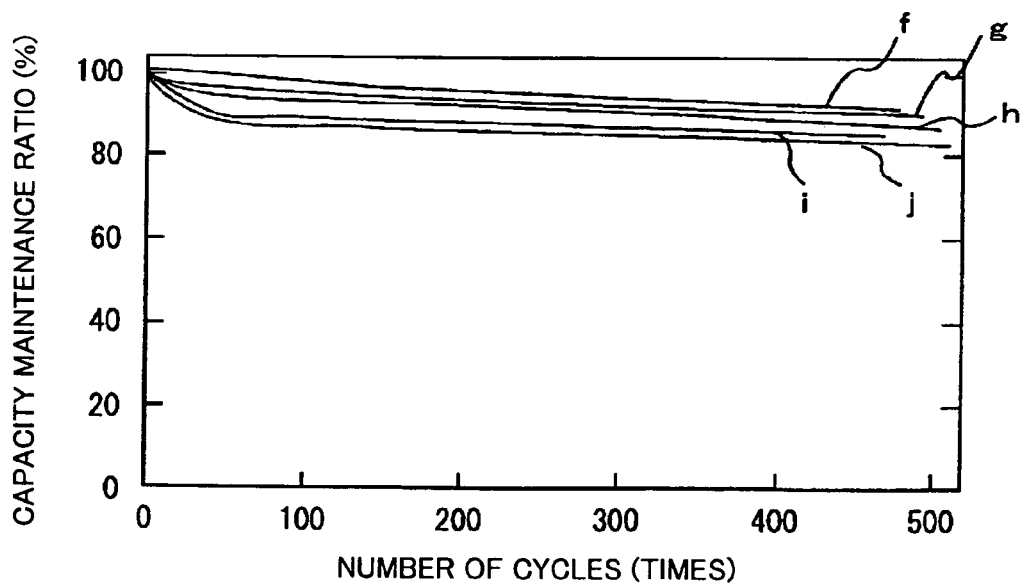
FIG. 4 shows the result of a cycle life test conducted at 60° C. on batteries (f to j) in which the active material of Example 1 is utilized.
Figure 5:
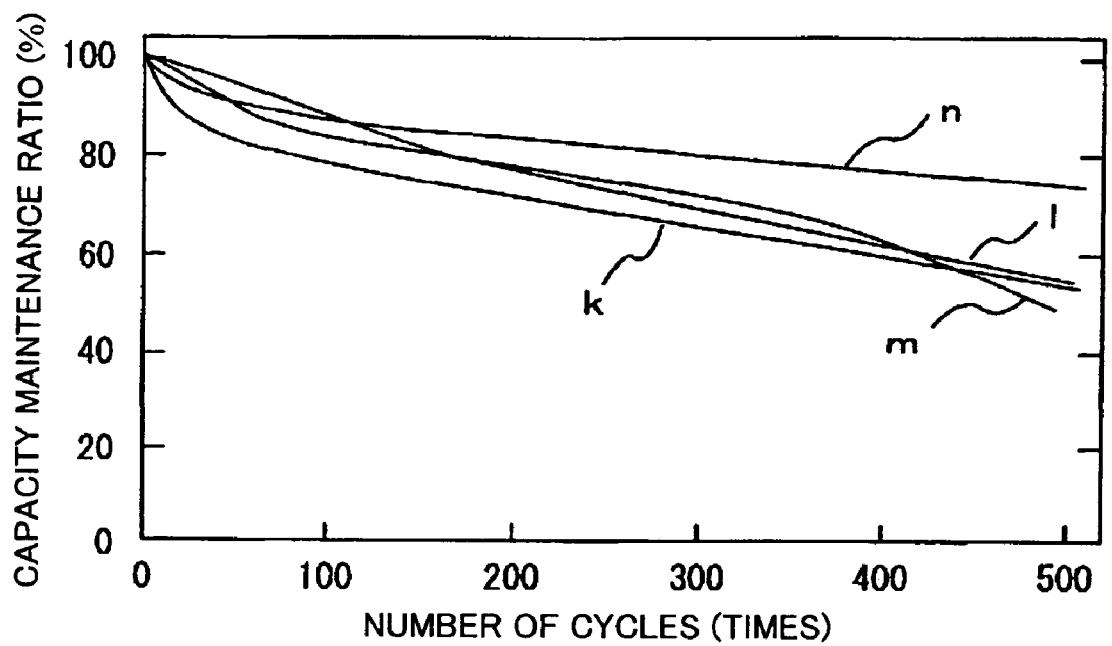
FIG. 5 shows the result of a cycle life test conducted at 60° C. on batteries (k to n) in which the active material of Comparative Example 1 is utilized.

A cycle life test was conducted at 60° C. on each of batteries other than those mentioned above that were prepared simultaneously. FIG. 3 shows the result of the test up to 500 cycles, which involved a charge end voltage of 4.15 V and a discharge end voltage of 2.8 V, with the measurement current corresponding to 1C. In the cases of the batteries employing the active materials (a) to (j) of Example 1, the capacity after 500 cycles was more than 80% of the initial capacity. In the cases of batteries employing the active materials (k) to (m) in Comparative Example 1, the capacity deteriorated to 60% or less of the initial capacity. Even in the case of the active material (n), which showed good characteristics among the comparative examples, the capacity dropped to approximately 70% of the initial capacity. Thus, in accordance with the invention, a cathode active material and a lithium battery in which safety and long-life are both realized can be obtained.

Example 2

Figure 6:
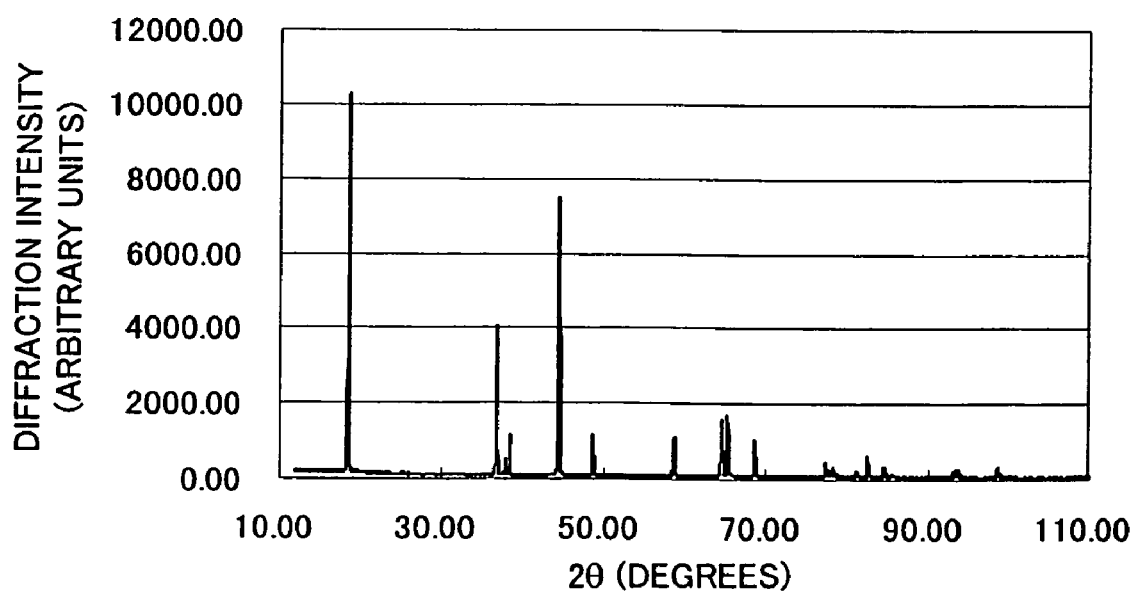
FIG. 6 shows the X-ray diffraction pattern of a complex oxide material in Example 2.

The complex oxide material (h) of Example 1 was produced by the following process. Lithium carbonate, nickel hydroxide, manganese dioxide, germanium oxide, tricobalt tetroxide, and aluminum hydroxide were mixed as raw materials such that the metal elements had predetermined compositional ratios. The mixture was then subjected to a first calcination process at 870° C. for 10 hours in the air. The process was performed in a box-shaped calcination furnace, with the powder materials put in a high-purity alumina container. The materials after the first calcination process were then pulverized in a ball mill, and then subjected to a second calcination process at 1000° C. for 10 hours, thereby obtaining a complex oxide material. FIG. 6 shows the result of measuring the X-ray diffraction patterns of the material using the Cu-kα line (30 kV-200 mA, DS=0.5, SS=0.5, and RS=0.15). The diffraction patterns showed a hexagonal layered structure, with strong diffraction peaks being observed at angles of 18.7°, 36.9°, 48.3°, 59.1°, 63.2°, 65.0°, 67.9°, and 77.2° in terms of 2θ value. Half-value widths obtained by curve-fitting these diffraction peaks after separating the kα line and kβ line were between 0.12° and 0.25° for each angle, thus indicating the presence of good crystallinity.

Figure 7:
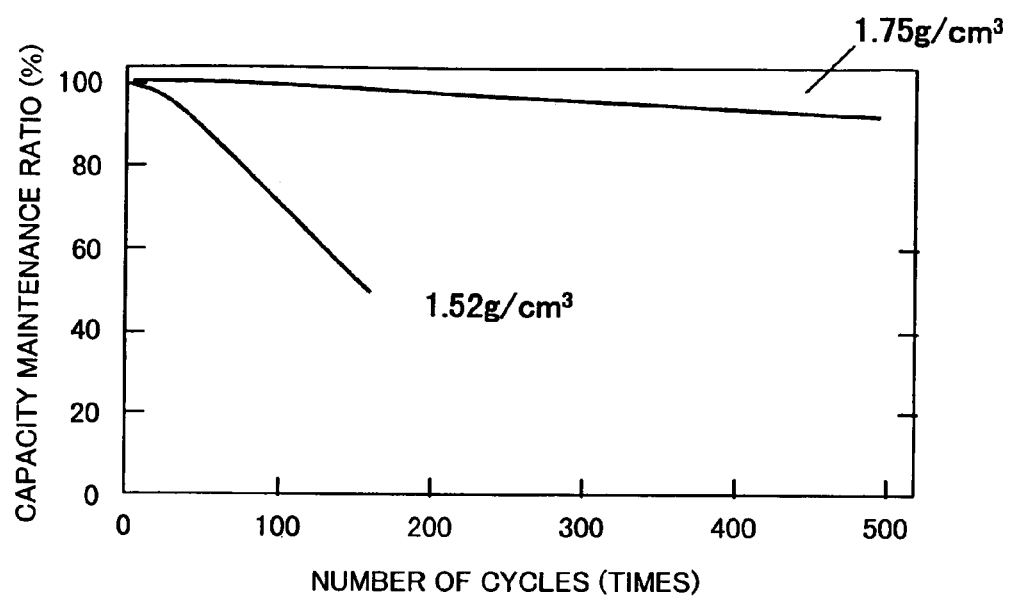
FIG. 7 shows the result of a cycle life test conducted at 60° C. on a battery in which the active material of Example 1 is utilized.

In order to use the oxide compound material of the invention as a battery material, powder property was adjusted by sieve classification and air classification. Initially, the maximum grain size was reduced to 40 micrometers or smaller by sieve classification. Then, hollow particles and solid particles were separated by air classification, which can be made by adjusting air volume. The resultant powder included a material containing the majority of solid particles with the tap density of 1.75 g/cm³, and a material containing the majority of hollow particles with the tap density of 1.52 g/cm³. These materials with two tap densities were used as cathode active materials for a lithium battery, and cylindrical batteries were made by the same procedure as that for Example 1, which was then followed by a cycle life test at 60° C. The result showed that, as shown in FIG. 7, the battery that employed the material with the tap density of 1.75 g/cm³ had a higher capacity maintenance ratio relative to the number of cycles. The battery comprising the material with the tap density of 1.52 g/cm³ exhibited a large deterioration in capacity. This is due to the fact that the breakdown of electron conduction or ion conduction path is prevented by the solidness of the particles.

By using the complex oxide material of the invention as the cathode active material for a nonaqueous lithium secondary battery, a safe and long-life lithium secondary battery can be provided.

What is claimed is:

1. A complex oxide material with a layered structure containing at least Li and Ni, further comprising a quadrivalent element other than Mn and a trivalent element other than Co, said material being represented by a chemical formula $Li_xNi_a(Mn_yM_{1-y})_b(Co_zM'_{1-z})_cO_2$ ($0<x<1.2$, $0<y<1$, $0<z<1$, $a+b+c=1$, $9b \leq 5a+2.7$, $0<a<1$, $0<b<1$, $0<c<1$, M: quadrivalent element other than Mn, and M': trivalent element other than Co) wherein the half-value width of any diffraction peak that appears at angles of 20° or greater and 80° or smaller in terms of 2θ value in an X-ray diffraction measurement using the Cu-kα line is 0.25 degrees or smaller.

2. The complex oxide material according to claim 1, represented by a chemical formula $Li_xNi_a(Mn_yM_{1-y})_b(Co_zM'_{1-z})_cO_2$ ($0<x<1.2$, $0<y<1$, $0<z<1$, $a+b+c=1$, $9b \leq 5a+2.7$, $0<a<1$, $0<b<1$, $0<c<1$, M: at least one quadrivalent element Si, Ge, or Sn, and M': at least one trivalent element B, Al, or In).

3. A cathode active material for a lithium secondary battery containing at least Li and Ni, further comprising a quadrivalent element other than Mn and a trivalent element other than Co, said material being represented by a chemical formula $Li_xNi_a(Mn_yM_{1-y})_b(Co_zM'_{1-z})_cO_2$ ($0<x<1.2$, $0<y<1$, $0<z<1$, $a+b+c=1$, $9b \leq 5a+2.7$, $0<a<1$, $0<b<1$, $0<c<1$, M: quadrivalent element other than Mn, and M': trivalent element other than Co) wherein the half-value width of any diffraction peak that appears at angles of 20° or greater and 80° or smaller in terms of 2θ value in an X-ray diffraction measurement using the Cu-kα line is 0.25 degrees or smaller.

4. The cathode active material for a lithium secondary battery containing at least Li and Ni according to claim 3, being represented by a chemical formula $Li_xNi_a(Mn_yM_{1-y})_b(Co_zM'_{1-z})_cO_2$ ($0<x<1.2$, $0<y<1$, $0<z<1$, $a+b+c=1$, $9b \leq 5a+2.7$, $0<a<1$, $0<b<1$, $0<c<1$, M: at least one quadrivalent element Si, Ge, or Sn, and M': at least one trivalent element B, Al, or In).

5. The cathode active material for a lithium secondary battery according to claim 3, wherein the tap density is 1.6 g/cm³ or greater and 2.1 g/cm³ or smaller.

6. A nonaqueous lithium secondary battery comprising a cathode containing at least a Li complex oxide and a negative electrode containing graphite or amorphous carbon material, wherein said Li complex oxide contained in said cathode is the cathode active material according to claim 3.

7. A method for manufacturing said cathode active material for a lithium secondary battery according to claim 3, comprising subjecting a mixture of materials with a predetermined metal compositional ratio to a first calcination process at 800° C. to 950° C. in an atmosphere of air, and then to a second calcination process at 1000° C. to 1100° C. in an atmosphere of air.

8. the complex oxide material according to claim 1, wherein the complex oxide material is provided by subjecting a mixture of materials with a predetermined metal compositional ratio to a first calcination process at 800° C. to 950° C. in an atmosphere of air, and then to a second calcination process at 1000° C. to 1100° C. in an atmosphere of air.

9. The cathode active material for a lithium secondary battery according to claim 3, wherein the cathode active material is provided by subjecting a mixture of materials with a predetermined metal compositional ratio to a first calcination process at 800° C. to 950° C. in an atmosphere of air, and then to a second calcination process at 1000° C. to 1100° C. in an atmosphere of air.

\* \* \* \* \*

UNITED STATES PATENT AND TRADEMARK OFFICE
CERTIFICATE OF CORRECTION

PATENT NO. : 7,582,383 B2 Page 1 of 1
APPLICATION NO. : 11/211698
DATED : September 1, 2009
INVENTOR(S) : Kasai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this

Fourteenth Day of September, 2010

David J. Kappos
*Director of the United States Patent and Trademark Office*